Nov. 11, 1958     J. O. EDSTRÖM ET AL     2,860,046
METHOD OF EXOTHERMICALLY REDUCING OXIDIC ORES
Filed May 1, 1957
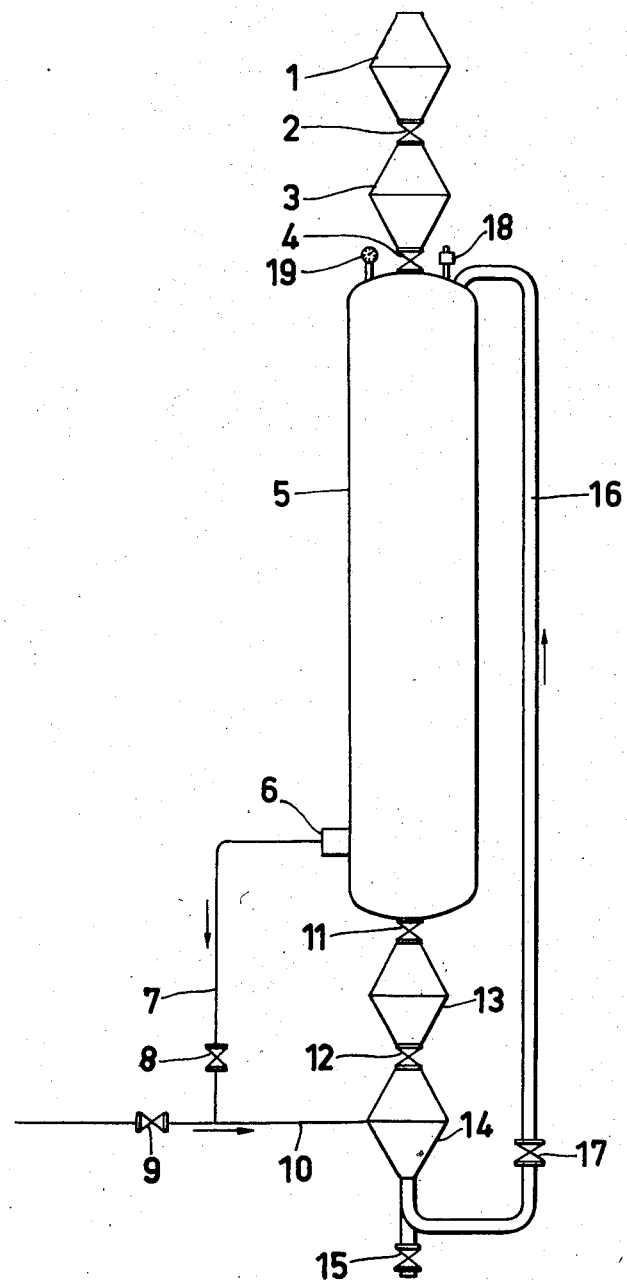
INVENTORS
JOHN OLOF EDSTRÖM
ULF ÖRJAN HELGOSSEN WIBERG
BY
ATTORNEY United States Patent Office 2,860,046
Patented Nov. 11, 1958

2,860,046

METHOD OF EXOTHERMICALLY REDUCING OXIDIC ORES

John Olof Edström, Enskede, and Ulf Örjan Helgosson Wiberg, Vasteras, Sweden

Application May 1, 1957, Serial No. 656,291

Claims priority, application Sweden May 4, 1956

13 Claims. (Cl. 75—91)

It is a well-known fact that iron oxides can be reduced with hydrogen within the temperature range of 300–1200° C. It is of particular interest that a fast reduction can be carried out at temperatures as low as 400–600° C. As hydrogen is a comparatively expensive reducing agent, and as the position of equilibrium of the reductions is such that a complete transformation of the gas into water vapour is impossible, gas circulation and condensation of the water vapour have been tried. Owing to the comparatively low content of water in the escaping reduction gas, this method involves great losses of heat. Owing to the fact that the reduction is endothermic, heat supply to the zone of reaction is necessary, and this also makes the reaction more difficult and expensive.

It has also been proposed to counteract the decrease of temperature by mixing the reduction gas (hydrogen) with carbon dioxide and simultaneously mixing the charge with an agent that absorbs carbon dioxide under evolution of heat. By this means, however, it is of course not possible to avoid the drawbacks of the water vapour formed in the reduction gas. On the contrary, there is risk of more water vapour being formed by the reaction of the hydrogen with the carbon dioxide.

The present invention relates to a method for reducing oxidic ores, preferably iron ore, with hydrogen as reducing agent, by means of which the total reaction will be exothermic so that the risk of cooling or the necessity of outer heating is eliminated, and, secondly, the content of vapour in the reducing gas is kept at a very low value.

This new method is mainly characterized by reducing a charge, consisting of a mixture of a pulverulent ore and pulverulent burnt lime, the mixture being pressed to briquets or the like, with hydrogen under at least such a pressure that the partial pressure in the gas atmosphere of the water vapour, formed during the reaction, at the equilibrium with certainty exceeds the dissociation pressure of calcium hydroxide at the reduction temperature, and at a temperature within the range, known per se, for maximal rate of reduction with hydrogen under 1000° C., viz. about 400–700° C. and conveniently at a temperature between 500 and 550° C., the burnt lime in the charge reacting with the water vapour formed during the reaction, forming calcium hydroxide and simultaneously evolving so much heat that the total reaction will be at least somewhat exothermic.

After thorough investigations and theoretical studies of the processes the inventors, by reacting the reduction gases also with burnt lime as drying agent and by thoroughly balancing the pressure and the temperature of the process, have been able to show that, on one hand, the same reactions can be brought to proceed exothermically, and on the other hand the hydrogen can be practically completely utilized without circulation and condensation of the water vapour.

As the burnt lime, when absorbing the water, formed at the reduction, is converted into slaked lime, the pressure in the reduction chamber should be varied in respect of the temperature of reduction, from atmospheric pressure at 400° C. to nearly 40 atm. at 700° C. It is most convenient to carry out the reduction at a temperature of about 500–550° C., that is, near the temperature for the maximum rate of iron oxide reduction with hydrogen under 1000° C. At the said temperature range of 500–550° C. a pressure of only about 10 atm. is necessary. Owing to the evolution of heat when the burnt lime is slaked with the water vapour in the reduction gas, the total process will be rather strongly exothermic, and, therefore, no outer heat supply is necessary. Sometimes it may even be suitable to cool the zone of reaction.

The drying agent might be mixed with the charge of reduction or the drying agent may be placed in a separate filter in a circulation conduit for the reduction gas.

When a separate drying filter is used, this can be kept at a lower temperature than the ore, thus, absorption of water can be accomplished at a lower total pressure than if ore and lime are mixed. When the temperature of the lime is below 400° C., a total pressure of one atmosphere is sufficient. At such a performance the suction of gas through the ore layer can be accomplished by the vacuum caused by the absorption of steam by lime in the reduction gas used.

For improving the heat economy of the process, it could be conveniently carried out under circulation with surplus gas, the gas being passed through the reaction chamber in counterflow against the charge to be reduced, first being heated by the reduced material, then taking part in the reduction and finally preheating the material just charged.

If a separate lime filter is used, the heat of reaction from the slaking of the lime may be utilized, e. g. by circulation of gas between the reaction chambers. This performance facilitates separation of lime ingredients. On the other hand it will be more difficult to keep an even temperature through the whole charge.

No special reduction furnace is necessary, but the process can, according to the invention, be carried out in different kinds of furnaces, e. g. a wedge-furnace, a shaft furnace, a roller type furnace, a fluidizing hearth etc.

Thus, all types of reactors for carrying out reactions between gases and solid material including reactors having moving and fluidizing bed can be used.

Figure 1 illustrates diagrammatically a simple embodiment, the charge being caused to circulate and thereby mixed in a reactor equipped with one or more circulation tubes, the diameter of which can be large or small as compared with the diameter of the reactor, through these tubes, which may be applied outside or inside the reactor, the charge is taken out at the lower part of the reactor and restored at the top of the reactor.

The conveyance of powder in the tubes can for instance be accomplished by the dense phase pneumatic transportation method (the hyperflow method), characterized in that powder in comparatively compact form is conveyed through a tube by a flow of gas. This method in which a small amount of gas is used for the conveyance of powder, is particularly adapted for circulation and mixing of the charge, when employing the principle according to the present invention and when using the reduction gas as a means of conveyance. The present principle includes maintaining a high reduction potential without supplying and removing large quantities of gas in the reduction chamber. Of course, also other methods can be employed for the conveyance of the charge through the circulation tubes, including mechanical means of conveyance, for example pumps for powder, screws, bucket elevators, et cetera. The lime and the ore can be conveyed when mixed or separately. The direction of conveyance may be from the bottom to the top and vice versa, and the reactor as well as the transport tubes may be vertical, bent or even lying.

Referring now to the drawing reference numeral 1 is a feed hopper for the material to be reduced, 2 is a lock valve, 3 is a lock hopper, 4 is a feed valve to the reduction chamber 5, and 6 is a filter through which gas can be drawn from the reduction chamber, 7 is a return tube for the gas, 8 is a control valve, and 9 is a valve for fresh gas feed through the gas inlet 10. Reference numeral 11 is an outlet valve for material from the reduction chamber, 13 is a lock hopper and 12 is a lock. Reference numeral 14 designates a hopper from which material may be taken out of the system through the valve 15 or circulated back to the chamber 5 through the tube of circulation 16 by means of freshly fed gas or alternatively carrier gas added. Reference numeral 17 designates a regulating valve for the circulating material, 18 designates a pressure regulator and 19 designates a manometer.

The process according to the present invention can be carried out continuously or discontinuously.

The ore can be supplied as lumps, sinter, ball sinter or briquets, but a finely divided, pulverized oxide might be most suitable.

The drying agent, burnt lime, may be present in the form of powder, briquets, balls or lumps. Ore and burnt lime can be added separately or in mixture. If balls, briquets or other compacts are used, these may be manufactured from a mixture of ore and burnt lime.

When balls or other compacts are to be made, it may be favourable to roll the ore concentrate on cores of carbonate, for example limestone. The compacts are then burnt and the carbonate is dissociated. When such a compact is reduced as per the equilibrium Reaction 1 shown below the reduction gas will the whole time be soaked into the ore, and steam will be absorbed there because of the low pressure steam in the core.

As mentioned above such oxides can be used, as drying agent, the hydroxides of which have a lower dissociation pressure than the partial pressure of the water vapour in the departing reduction gas at the temperature and pressure in question. Calcium oxide, CaO, is particularly favourable. At the reduction of magnetite in the presence of calcium oxide according to the invention the reaction occurs according to the following total formula:

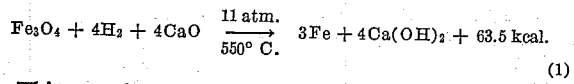

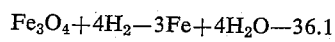

This may be compared with the formula for an ordinary $H_2$-reduction:

$$Fe_3O_4 + 4H_2 \rightarrow 3Fe + 4H_2O - 36.1$$

which reaction is heat consuming.

The reduction is catalyzed by CaO present and is also strongly facilitated by increased pressure. If the reduction is intended to be carried out at lower pressure, e. g. atmospheric pressure, and and/or at higher temperature, it may be more suitable to substitute barium oxide for the burnt lime. As a principle, all oxides may be used, which fulfill the above conditions. If the iron obtained is pyrophoric, due to a low temperature of reaction, this state can be eliminated, for instance, by passing the iron, after the reduction, through a zone of high temperature before it is cooled and brought into the air.

Another way to prevent reduced iron from being pyrophoric is to add small amounts of halides. Thus for instance 0.5% HCl has proved to prevent the iron from being pyrophoric after reduction at 500° C. The reduced iron can also in a neutral or reducing atmosphere be rolled or pressed to compacts before being brought into the air.

When gas, obtained by partial combustion and water conversion of mineral oil or other hydrocarbons, is used as reducing agent, present CO can be prevented from being catalytic decomposed to C and $CO_2$ by addition of very small amounts of $N_2C$, $NO_2$, $NH_3$, $Cl_2$, $(CN)_2$, $H_2S$ or $SO_2$ to the reducing gas.

The reduction method presented in this patent application is described above as adapted to the reduction of iron oxides, but it can of course as well be used for all oxides, that can be reduced by hydrogen.

When using metal powder fabricated according to the above described reduction method for direct hot rolling of sheet material from powder it is advisable to place before the rolling operation the metal powder in a box made from the same metal or even other metals. This performance prevents the metal powder from being oxidized and also gives the rolled product a good surface, namely the one of the sheet of the box.

What we claim is:

1. A method of reducing metal oxidic ores, which comprises treating a mixture of the metal oxidic ore and an oxide, which forms a difficultly dissociated hydroxide, with hydrogen as the reducing gas under such conditions of reduction pressure, reduction temperature and amount of material that the partial pressure of steam in the gas atmosphere formed during the reduction at equilibrium between ore oxide and hydrogen gas steam positively exceeds the dissociation pressure of the difficultly dissociated hydroxide at the reduction temperature, and that the latter is kept within the range covering 400° to 700° centigrade, preferably at a temperature of about 550° centigrade, and that the said oxide making part of the charge reacts with nearly all the steam formed during the reduction, hydroxide being formed during simultaneous generation of so much heat that the total reaction becomes exothermic.

2. A method according to claim 1, characterized in that the oxide reacting with steam is burnt lime.

3. A method according to claim 1, characterized in that the oxide reacting with steam is arranged in a special container.

4. A method according to claim 1, characterized in that the oxide reacting with steam is briquetted before being charged into the furnace.

5. A method according to claim 1, characterized in that the reaction furnace is charged with compact bodies consisting of a core of burnt lime and an outer layer of ore slick.

6. A method according to claim 1, characterized in that the compact bodies are prepared by rolling on ore slick on the limestone core with or without binding agent and subsequent burning under conversion of limestone into oxide.

7. A method according to claim 1, characterized in that hydrogen halide is admixed into the reduction gas in an amount less than 1%.

8. A method according to claim 1, characterized in that the reduction is carried out with a gas formed through partial combustion and conversion of oil and/or carbon hydrogen.

9. A method according to claim 1, characterized in that a substance active as reaction hampering against precipitation of C from CO is added to the gas.

10. A method according to claim 1, characterized in that the reduced material, particularly when reduced at a low temperature, is subjected to a final heating at so high a temperature that it certainly is no longer pyroforic.

11. A method according to claim 1, characterized in that the reduced material is compressed or rolled together.

12. A method according to claim 1, characterized in that a subpressure formed through absorption of steam in the absorption oxide is used for sucking reduction gas through a bed of the oxide to be reduced.

13. A method of carrying out a reduction process according to claim 1, characterized in that the charge is reacted with the reduction gas in a reactor through which the material is caused to circulate by means of feeding-in and feeding-out circulation conduits.

References Cited in the file of this patent

UNITED STATES PATENTS

| | | |
|---|---|---|
| 137,621 | Pedder | Apr. 8, 1873 |
| 2,132,149 | Edwin | Oct. 4, 1938 |
| 2,609,288 | Stuart | Sept. 2, 1952 |